US010120852B2

(12) United States Patent
Goto et al.

(10) Patent No.: US 10,120,852 B2
(45) Date of Patent: Nov. 6, 2018

(54) DATA PROCESSING METHOD, NON-TRANSITORY COMPUTER-READABLE STORAGE MEDIUM, AND DATA PROCESSING DEVICE

(71) Applicant: FUJITSU LIMITED, Kawasaki-shi, Kanagawa (JP)

(72) Inventors: Keisuke Goto, Kawasaki (JP); Yuiko Ohta, Kawasaki (JP); Hiroaki Morikawa, Kawasaki (JP); Hiroya Inakoshi, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 79 days.

(21) Appl. No.: 15/230,592

(22) Filed: Aug. 8, 2016

(65) Prior Publication Data

US 2017/0046327 A1 Feb. 16, 2017

(30) Foreign Application Priority Data

Aug. 10, 2015 (JP) ................................ 2015-158512

(51) Int. Cl.
*G06F 17/20* (2006.01)
*G06F 17/24* (2006.01)

(52) U.S. Cl.
CPC .......... *G06F 17/246* (2013.01); *G06F 17/245* (2013.01)

(58) Field of Classification Search
CPC ............................ G06F 17/245; G06F 17/246
See application file for complete search history.

(56) References Cited

U.S. PATENT DOCUMENTS 5,255,356 A 10/1993 Michelman et al.
5,987,481 A * 11/1999 Michelman ........... G06F 17/246 715/219
6,225,996 B1 * 5/2001 Gibb ..................... G06F 17/246 715/209

(Continued)

FOREIGN PATENT DOCUMENTS

JP 3-163660 7/1991
JP 7-43707 5/1995

(Continued)

OTHER PUBLICATIONS

Zhe Chen et al., "Automatic Web Spreadsheet Data Extraction", SSW' 13, Aug. 30, 2013 (8 pages).

*Primary Examiner* — Keith D Bloomquist
(74) *Attorney, Agent, or Firm* — Fujitsu Patent Center

(57) ABSTRACT

A data processing method executed by a computer, the data processing method including specifying a first region range among from a data table, a first region range including a plurality of numerical value regions which are continuously disposed in a first direction, a plurality of numerical values in the plurality of numerical value regions having a relationship with a specified numerical value in an adjacent region, specifying a second region range, the second region range being specified by shifting the first region range in a second direction, the second region range including at least one character string region and at least one blank region, associating a character string in the at least one character string region and the plurality of numerical values, and outputting data that indicates an association between the character string in the at least one character string region and the plurality of numerical values.

7 Claims, 22 Drawing Sheets

(56) References Cited

U.S. PATENT DOCUMENTS

| | | | | |
|---|---|---|---|---|
| 7,256,784 B2 * | 8/2007 | Palmer | G06F 17/211 | 345/440 |
| 7,324,109 B2 * | 1/2008 | Palmer | G06F 17/211 | 345/440 |
| 7,546,523 B2 * | 6/2009 | Aureglia | G06F 17/246 | 715/212 |
| 8,707,166 B2 * | 4/2014 | Wagner | G06F 17/245 | 715/204 |
| 8,782,508 B2 * | 7/2014 | Bauchot | G06F 17/245 | 715/212 |
| 2001/0032214 A1 * | 10/2001 | Bauchot | G06F 17/246 | 715/212 |
| 2006/0218483 A1 * | 9/2006 | Weitzman | G06F 17/246 | 715/212 |
| 2009/0031206 A1 * | 1/2009 | Aureglia | G06F 17/246 | 715/217 |
| 2010/0083086 A1 * | 4/2010 | Berger | G06F 17/246 | 715/213 |
| 2011/0087954 A1 * | 4/2011 | Dickerman | G06F 17/246 | 715/219 |
| 2014/0372852 A1 * | 12/2014 | Rothschiller | G06F 17/246 | 715/212 |
| 2014/0372854 A1 * | 12/2014 | Otero | G06F 17/246 | 715/219 |
| 2017/0124048 A1 * | 5/2017 | Campbell | G06F 17/212 | |
| 2017/0124058 A1 * | 5/2017 | Otero | G06F 17/246 | |

FOREIGN PATENT DOCUMENTS

| | | |
|---|---|---|
| JP | 2011-525029 | 9/2011 |
| JP | 2013-257852 | 12/2013 |
| WO | 2009/155144 | 12/2009 |

* cited by examiner

FIG. 1

| 1 | A B C D E F G | H | I | J | K | L |
|---|---|---|---|---|---|---|
| 2 | TABLE 8 TRANSITION OF FUNCTIONAL SOCIAL SECURITY BENEFITS (FROM FY 2004 (HEISEI 16) TO FY 2008 (HEISEI 20)) | | | | | |
| 3 | | | | | | (UNIT: MILLION YEN) |
| 4 | | FY 2004 (HEISEI 16) | FY 2004 (HEISEI 17) | FY 2004 (HEISEI 18) | FY 2004 (HEISEI 19) | FY 2004 (HEISEI 20) |
| 5 | SOCIAL SECURITY BENEFITS | 85,866,002 | 87,782,7488 | 89,109,7948 | 91,430,462 | 94,084,8249 |
| 6 | Ⅰ ELDERLY PEOPLE | 42,822,083 | 43,604,210 | 44,661,789 | 45,790,008 | 47,264,934 |
| 7 | CASH BENEFITS | 37,188,028 | 37,825,636 | 38,712,106 | 39,680,915 | 40,880,430 |
| 8 | RETIREMENT PENSIONS | 36,724,189 | 37,614,277 | 38,511,893 | 39,349,853 | 40,524,006 |
| 9 | EARLY-RETIREMENT PENSIONS | — | — | — | — | — |
| 10 | LUMP-SUM BENEFITS | — | — | — | — | — |
| 11 | RETIREMENT (OLD-AGE) BENEFITS | 402,665 | 150,926 | 146,896 | 131,367 | 141,093 |
| 12 | OTHER CASH BENEFITS | 61,174 | 60,434 | 53,617 | 199,695 | 215,331 |
| 13 | IN-KIND BENEFITS | 5,634,055 | 5,778,574 | 5,949,684 | 6,109,092 | 6,384,503 |
| 14 | Ⅱ BEREAVED FAMILIES | 6,252,736 | 6,368,386 | 6,447,860 | 6,575,538 | 6,629,783 |
| 15 | CASH BENEFITS | 6,252,220 | 6,367,958 | 6,447,516 | 6,575,025 | 6,629,509 |
| 16 | SURVIVOR PENSIONS | 6,147,198 | 6,261,849 | 6,358,906 | 6,452,727 | 6,516,459 |
| 17 | LUMP-SUM BENEFITS | 11,431 | 12,228 | 12,443 | 13,102 | 13,854 |
| 18 | SURVIVOR BENEFITS | — | — | — | — | — |
| 19 | OTHER CASH BENEFITS | 93,591 | 93,882 | 76,166 | 109,196 | 98,896 |
| 20 | IN-KIND BENEFITS | 517 | 427 | 344 | 513 | 274 |
| 21 | COST OF BURIAL | — | — | — | — | — |
| 22 | OTHERS | 517 | 427 | 344 | 513 | 274 |

ATTRIBUTE PORTION DATA

NUMERICAL PORTION DATA

FIG. 2

(LEFT PART: CASH BENEFITS, UPPER PART: FY 2005 (HEISEI 17))

| 1 | A B C D E F G | H | I | J | K | L |
|---|---|---|---|---|---|---|
| 2 | TABLE 8 TRANSITION OF FUNCTIONAL SOCIAL SECURITY BENEFITS (FROM FY 2004 (HEISEI 16) TO FY 2008 (HEISEI 20)) | | | | | |
| 3 | | | | | | (UNIT: MILLION YEN) |
| 4 | | FY 2004 (HEISEI 16) | FY 2004 (HEISEI 17) | FY 2004 (HEISEI 18) | FY 2004 (HEISEI 19) | FY 2004 (HEISEI 20) |
| 5 | SOCIAL SECURITY BENEFITS | 85,866,002 | 87,782,7488 | 89,109,7948 | 91,430,462 | 94,084,8249 |
| 6 | I ELDERLY PEOPLE | 42,822,083 | 43,604,210 | 44,661,789 | 45,790,008 | 47,264,934 |
| 7 | CASH BENEFITS | 37,188,028 | 37,825,636 | 38,712,106 | 39,680,915 | 40,880,430 |
| 8 | RETIREMENT PENSIONS | 36,724,189 | 37,614,277 | 38,511,893 | 39,349,853 | 40,524,006 |
| 9 | EARLY-RETIREMENT PENSIONS | — | — | — | — | — |
| 10 | LUMP-SUM BENEFITS | — | — | — | — | — |
| 11 | RETIREMENT (OLD-AGE) BENEFITS | 402,665 | 150,926 | 146,896 | 131,367 | 141,093 |
| 12 | OTHER CASH BENEFITS | 61,174 | 60,434 | 53,617 | 199,695 | 215,331 |
| 13 | IN-KIND BENEFITS | 5,634,055 | 5,778,574 | 5,949,684 | 6,109,092 | 6,384,503 |
| 14 | II BEREAVED FAMILIES | 6,252,736 | 6,368,386 | 6,447,860 | 6,575,538 | 6,629,783 |
| 15 | CASH BENEFITS | 6,252,220 | 6,367,958 | 6,447,516 | 6,575,025 | 6,629,509 |
| 16 | SURVIVOR PENSIONS | 6,147,198 | 6,261,849 | 6,358,906 | 6,452,727 | 6,516,459 |
| 17 | LUMP-SUM BENEFITS | 11,431 | 12,228 | 12,443 | 13,102 | 13,854 |
| 18 | SURVIVOR BENEFITS | — | — | — | — | — |
| 19 | OTHER CASH BENEFITS | 93,591 | 93,882 | 76,166 | 109,196 | 98,896 |
| 20 | IN-KIND BENEFITS | 517 | 427 | 344 | 513 | 274 |
| 21 | COST OF BURIAL | — | — | — | — | — |
| 22 | OTHERS | 517 | 427 | 344 | 513 | 274 |

FIG. 3

UNEXPLICIT HIERARCHICAL STRUCTURE

| 1 | A B C D E F G | H | I | J | K | L |
|---|---|---|---|---|---|---|
| 2 | TABLE 8 TRANSITION OF FUNCTIONAL SOCIAL SECURITY BENEFITS (FROM FY 2004 (HEISEI 16) TO FY 2008 (HEISEI 20)) | | | | | |
| 3 | | | | | | (UNIT: MILLION YEN) |
| 4 | | FY 2004 (HEISEI 16) | FY 2004 (HEISEI 17) | FY 2004 (HEISEI 18) | FY 2004 (HEISEI 19) | FY 2004 (HEISEI 20) |
| 5 | SOCIAL SECURITY BENEFITS | 85,866,002 | 87,782,7488 | 89,109,7948 | 91,430,462 | 94,084,8249 |
| 6 | I ELDERLY PEOPLE | 42,822,083 | 43,604,210 | 44,661,789 | 45,790,008 | 47,264,934 |
| 7 | CASH BENEFITS | 37,188,028 | 37,825,636 | 38,712,106 | 39,680,915 | 40,880,430 |
| 8 | RETIREMENT PENSIONS | 36,724,189 | 37,614,277 | 38,511,893 | 39,349,853 | 40,524,006 |
| 9 | EARLY-RETIREMENT PENSIONS | — | — | — | — | — |
| 10 | LUMP-SUM BENEFITS | — | — | — | — | — |
| 11 | RETIREMENT (OLD-AGE) BENEFITS | 402,665 | 150,926 | 146,896 | 131,367 | 141,093 |
| 12 | OTHER CASH BENEFITS | 61,174 | 60,434 | 53,617 | 199,695 | 215,331 |
| 13 | IN-KIND BENEFITS | 5,634,055 | 5,778,574 | 5,949,684 | 6,109,092 | 6,384,503 |
| 14 | II BEREAVED FAMILIES | 6,252,736 | 6,368,386 | 6,447,860 | 6,575,538 | 6,629,783 |
| 15 | CASH BENEFITS | 6,252,220 | 6,367,958 | 6,447,516 | 6,575,025 | 6,629,509 |
| 16 | SURVIVOR PENSIONS | 6,147,198 | 6,261,849 | 6,358,906 | 6,452,727 | 6,516,459 |
| 17 | LUMP-SUM BENEFITS | 11,431 | 12,228 | 12,443 | 13,102 | 13,854 |
| 18 | SURVIVOR BENEFITS | — | — | — | — | — |
| 19 | OTHER CASH BENEFITS | 93,591 | 93,882 | 76,166 | 109,196 | 98,896 |
| 20 | IN-KIND BENEFITS | 517 | 427 | 344 | 513 | 274 |
| 21 | COST OF BURIAL | — | — | — | — | — |
| 22 | OTHERS | 517 | 427 | 344 | 513 | 274 |

FIG. 4

SUM INPUT-OUTPUT RELATION

| 1 | A B C D E F G | H | I | J | K | L |
|---|---|---|---|---|---|---|
| 2 | TABLE 8 TRANSITION OF FUNCTIONAL SOCIAL SECURITY BENEFITS (FROM FY 2004 (HEISEI 16) TO FY 2008 (HEISEI 20)) | | | | | |
| 3 | | | | | | (UNIT: MILLION YEN) |
| 4 | | FY 2004 (HEISEI 16) | FY 2004 (HEISEI 17) | FY 2004 (HEISEI 18) | FY 2004 (HEISEI 19) | FY 2004 (HEISEI 20) |
| 5 | SOCIAL SECURITY BENEFITS | 85,866,002 | 87,782,7488 | 89,109,7948 | 91,430,462 | 94,084,8249 |
| 6 | I ELDERLY PEOPLE | 42,822,083 | 43,604,210 | 44,661,789 | 45,790,008 | 47,264,934 |
| 7 | CASH BENEFITS | 37,188,028 | 37,825,636 | 38,712,106 | 39,680,915 | 40,880,430 |
| 8 | RETIREMENT PENSIONS | 36,724,189 | 37,614,277 | 38,511,893 | 39,349,853 | 40,524,006 |
| 9 | EARLY-RETIREMENT PENSIONS | — | — | — | — | — |
| 10 | LUMP-SUM BENEFITS | — | — | — | — | — |
| 11 | RETIREMENT (OLD-AGE) BENEFITS | 402,665 | 150,926 | 146,896 | 131,367 | 141,093 |
| 12 | OTHER CASH BENEFITS | 61,174 | 60,434 | 53,617 | 199,695 | 215,331 |
| 13 | IN-KIND BENEFITS | 5,634,055 | 5,778,574 | 5,949,684 | 6,109,092 | 6,384,503 |
| 14 | II BEREAVED FAMILIES | 6,252,736 | 6,368,386 | 6,447,860 | 6,575,538 | 6,629,783 |
| 15 | CASH BENEFITS | 6,252,220 | 6,367,958 | 6,447,516 | 6,575,025 | 6,629,509 |
| 16 | SURVIVOR PENSIONS | 6,147,198 | 6,261,849 | 6,358,906 | 6,452,727 | 6,516,459 |
| 17 | LUMP-SUM BENEFITS | 11,431 | 12,228 | 12,443 | 13,102 | 13,854 |
| 18 | SURVIVOR BENEFITS | — | — | — | — | — |
| 19 | OTHER CASH BENEFITS | 93,591 | 93,882 | 76,166 | 109,196 | 98,896 |
| 20 | IN-KIND BENEFITS | 517 | 427 | 344 | 513 | 274 |
| 21 | COST OF BURIAL | — | — | — | — | — |
| 22 | OTHERS | 517 | 427 | 344 | 513 | 274 |

FIG. 6

NUMERICAL TABULAR DATA

| | | | | | |
|---|---|---|---|---|---|
| TRAFFIC ACCIDENTS | | | WATER ACCIDENTS | | |
| TOTAL NUMBER | DEATHS | INJURIES | TOTAL NUMBER | DEATHS | INJURIES |
| 150 | 50 | 100 | 30 | 10 | 20 |

ATTRIBUTE LABELING

ATTRIBUTE LABELING PATTERN

PATTERN EXAMPLE:

A CELL LOCATED IMMEDIATELY ABOVE A CERTAIN CELL IS TREATED AS A MASTER LABEL

IF THE CELL LOCATED IMMEDIATELY ABOVE THE CERTAIN CELL IS BLANK, A NON-BLANK CELL WHICH IS LOCATED ON THE LEFT-HAND SIDE OF THE CELL LOCATED IMMEDIATELY ABOVE THE CERTAIN CELL AND IS CLOSEST THERETO IS TREATED AS A MASTER LABEL

IF THERE ARE A PLURALITY OF STAGES, PROCESSING IS PERFORMED RECURSIVELY FROM A LOWER STAGE FOR EACH ROW OF AN UPPER STAGE

| TRAFFIC ACCIDENTS TOTAL NUMBER | TRAFFIC ACCIDENTS DEATHS | TRAFFIC ACCIDENTS INJURIES | WATER ACCIDENTS TOTAL NUMBER | WATER ACCIDENTS DEATHS | WATER ACCIDENTS INJURIES |
|---|---|---|---|---|---|
| 150 | 50 | 100 | 30 | 10 | 20 |

FIG. 7

NUMERICAL TABULAR DATA

| | TRAFFIC ACCIDENTS | | | WATER ACCIDENTS | |
|---|---|---|---|---|---|
| TOTAL NUMBER | DEATHS | INJURIES | TOTAL NUMBER | DEATHS | INJURIES |
| 150 | 50 | 100 | 30 | 10 | 20 |

ATTRIBUTE LABELING

ATTRIBUTE LABELING PATTERN

PATTERN EXAMPLE:

A CELL LOCATED IMMEDIATELY ABOVE A CERTAIN CELL IS TREATED AS A MASTER LABEL

IF THE CELL LOCATED IMMEDIATELY ABOVE THE CERTAIN CELL IS BLANK, A NON-BLANK CELL WHICH IS LOCATED ON THE LEFT-HAND SIDE OF THE CELL LOCATED IMMEDIATELY ABOVE THE CERTAIN CELL AND IS CLOSEST THERETO IS TREATED AS A MASTER LABEL

IF THERE ARE A PLURALITY OF STAGES, PROCESSING IS PERFORMED RECURSIVELY FROM A LOWER STAGE FOR EACH ROW OF AN UPPER STAGE

| TOTAL NUMBER | TRAFFIC ACCIDENTS DEATHS | TRAFFIC ACCIDENTS INJURIES | TRAFFIC ACCIDENTS TOTAL NUMBER | WATER ACCIDENTS DEATHS | WATER ACCIDENTS INJURIES |
|---|---|---|---|---|---|
| 150 | 50 | 100 | 30 | 10 | 20 |

INCORRECT STRUCTURE IS EXTRACTED AND LABELING IS PERFORMED

FIG. 8

NUMERICAL TABULAR DATA

UPPER STAGE ↕ LOWER STAGE

| | | | | | | | | | | | | |
|---|---|---|---|---|---|---|---|---|---|---|---|---|
| DISASTERS | | | | | | | | | | | | |
| | EARTH-QUAKES | | | TSUNAMIS | | | TRAFFIC ACCIDENTS | | | WATER ACCIDENTS | | |
| TOTAL NUMBER | TOTAL NUMBER | DEATHS | INJURIES | TOTAL NUMBER | DEATHS | INJURIES | TOTAL NUMBER | DEATHS | INJURIES | TOTAL NUMBER | DEATHS | INJURIES |
| 175 | 65 | 5 | 60 | 110 | 10 | 100 | 150 | 50 | 100 | 30 | 10 | 20 |

ATTRIBUTE LABELING

ATTRIBUTE LABELING PATTERN

PATTERN EXAMPLE:

A CELL LOCATED IMMEDIATELY ABOVE A CERTAIN CELL IS TREATED AS A MASTER LABEL

IF THE CELL LOCATED IMMEDIATELY ABOVE THE CERTAIN CELL IS BLANK, A NON-BLANK CELL WHICH IS LOCATED ON THE LEFT-HAND SIDE OF THE CELL LOCATED IMMEDIATELY ABOVE THE CERTAIN CELL AND IS CLOSEST THERETO IS TREATED AS A MASTER LABEL

IF THERE ARE A PLURALITY OF STAGES, PROCESSING IS PERFORMED RECURSIVELY FROM A LOWER STAGE FOR EACH ROW OF AN UPPER STAGE

| | | | | | | | | | | | | |
|---|---|---|---|---|---|---|---|---|---|---|---|---|
| DISASTERS | DISASTERS | DISASTERS | DISASTERS | DISASTERS | DISASTERS | DISASTERS | DISASTERS | DISASTERS | DISASTERS | DISASTERS | DISASTERS | DISASTERS |
| | EARTH-QUAKES | EARTH-QUAKES | EARTH-QUAKES | TSUNAMIS | TSUNAMIS | TSUNAMIS | TRAFFIC ACCIDENTS | TRAFFIC ACCIDENTS | TRAFFIC ACCIDENTS | WATER ACCIDENTS | WATER ACCIDENTS | WATER ACCIDENTS |
| TOTAL NUMBER | TOTAL NUMBER | DEATHS | INJURIES | TOTAL NUMBER | DEATHS | INJURIES | TOTAL NUMBER | DEATHS | INJURIES | TOTAL NUMBER | DEATHS | INJURIES |
| 175 | 65 | 5 | 60 | 110 | 10 | 100 | 150 | 50 | 100 | 30 | 10 | 20 |

STRUCTURE WHICH IS NOT INCLUDED IN ORIGINAL HIERARCHICAL STRUCTURE IS EXTRACTED AND LABELING IS PERFORMED

A CELL LOCATED IMMEDIATELY ABOVE A CERTAIN CELL IS TREATED AS A RELATED LABEL
IF THE CELL LOCATED IMMEDIATELY ABOVE THE CERTAIN CELL IS BLANK, A NON-BLANK CELL WHICH IS CLOSEST TO THE BLANK CELL IN A ROW DIRECTION IN THE RANGE OF A SUM INPUT-OUTPUT RELATION AND IS NOT INCLUDED IN A NESTING INPUT-OUTPUT RELATION IS TREATED AS A RELATED LABEL
IF THERE ARE A PLURALITY OF STAGES, PROCESSING IS PERFORMED RECURSIVELY FROM A LOWER STAGE FOR EACH ROW OF AN UPPER STAGE

NUMERICAL TABULAR DATA

| 1 | 2 | 3 | 4 | 5 | 6 |
|---|---|---|---|---|---|
| | TRAFFIC ACCIDENTS | | | WATER ACCIDENTS | |
| TOTAL NUMBER | DEATHS | INJURIES | TOTAL NUMBER | DEATHS | INJURIES |
| 150 | 50 | 100 | 30 | 10 | 20 |

NUMERICAL PORTION DATA

| 1 | 2 | 3 | 4 | 5 | 6 |
|---|---|---|---|---|---|
| 150 | 50 | 100 | 30 | 10 | 20 |

ATTRIBUTE PORTION DATA

| 1 | 2 | 3 | 4 | 5 | 6 |
|---|---|---|---|---|---|
| | TRAFFIC ACCIDENTS | | | WATER ACCIDENTS | |
| TOTAL NUMBER | DEATHS | INJURIES | TOTAL NUMBER | DEATHS | INJURIES |

FIG. 14A

NUMERICAL TABULAR DATA

12

| 1 | 2 | 3 | 4 | 5 | 6 | 7 | 8 | 9 | 10 | 11 | 12 | 13 |
|---|---|---|---|---|---|---|---|---|---|---|---|---|
| DISASTERS | | | | | | | | | | | | |
| | EARTH-QUAKES | | | TSUNAMIS | | | TRAFFIC ACCIDENTS | | | WATER ACCIDENTS | | |
| TOTAL NUMBER | TOTAL NUMBER | DEATHS | INJURIES | TOTAL NUMBER | DEATHS | INJURIES | TOTAL NUMBER | DEATHS | INJURIES | TOTAL NUMBER | DEATHS | INJURIES |
| 175 | 65 | 5 | 60 | 110 | 10 | 100 | 150 | 50 | 100 | 30 | 10 | 20 |

NUMERICAL PORTION DATA

14

| 1 | 2 | 3 | 4 | 5 | 6 | 7 | 8 | 9 | 10 | 11 | 12 | 13 |
|---|---|---|---|---|---|---|---|---|---|---|---|---|
| 175 | 65 | 5 | 60 | 110 | 10 | 100 | 150 | 50 | 100 | 30 | 10 | 20 |

ATTRIBUTE PORTION DATA

15

| 1 | 2 | 3 | 4 | 5 | 6 | 7 | 8 | 9 | 10 | 11 | 12 | 13 |
|---|---|---|---|---|---|---|---|---|---|---|---|---|
| DISASTERS | | | | | | | | | | | | |
| | EARTH-QUAKES | | | TSUNAMIS | | | TRAFFIC ACCIDENTS | | | WATER ACCIDENTS | | |
| TOTAL NUMBER | TOTAL NUMBER | DEATHS | INJURIES | TOTAL NUMBER | DEATHS | INJURIES | TOTAL NUMBER | DEATHS | INJURIES | TOTAL NUMBER | DEATHS | INJURIES |

FIG. 16A
$$\left| S[i] - \sum_{j \le x \le k} S[x] \right| \le e \quad , \qquad j \le k \text{ and } (i = j - 1 \text{ or } k + 1)$$
FIG. 16B
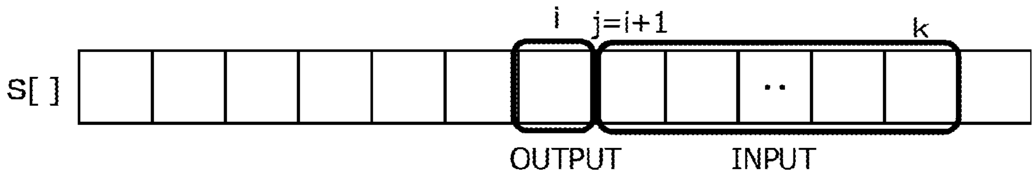
FIG. 16C
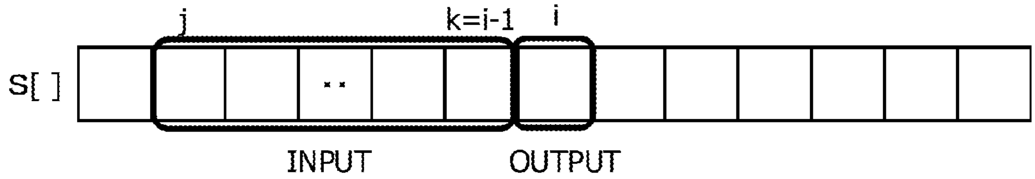

FIG. 18A

| | 1 | 2 | 3 | 4 | 5 | 6 |
|---|---|---|---|---|---|---|
| S | 150 | 50 | 100 | 30 | 10 | 20 |
| R | 150 | 200 | 300 | 330 | 340 | 360 |

$$|S[1]-(S[2]+S[3])| = |S[1]-(R[3]-R[1])| = 150-(300-150)=0 \leq e$$

$$|S[4]-(S[5]+S[6])| = |S[4]-(R[6]-R[4])| = 30-(360-330)=0 \leq e$$

FIG. 18B

SUM INPUT-OUTPUT RANGE

17

| 1 | 2 | 3 | 4 | 5 | 6 |
|---|---|---|---|---|---|
| | | | | | |

ATTRIBUTE PORTION DATA

| 1 | 2 | 3 | 4 | 5 | 6 |
|---|---|---|---|---|---|
| | TRAFFIC ACCIDENTS | | | WATER ACCIDENTS | |
| TOTAL NUMBER | DEATHS | INJURIES | TOTAL NUMBER | DEATHS | INJURIES |

17

SUM INPUT-OUTPUT RANGE

| 1 | 2 | 3 | 4 | 5 | 6 |
|---|---|---|---|---|---|
| | | | | | |

ATTRIBUTE LABELING

ATTRIBUTE LABELING PATTERN

A CELL LOCATED IMMEDIATELY ABOVE A CERTAIN CELL IS TREATED AS A RELATED LABEL
IF THE CELL LOCATED IMMEDIATELY ABOVE THE CERTAIN CELL IS BLANK, A NON-BLANK CELL WHICH IS CLOSEST TO THE BLANK CELL IN A ROW DIRECTION IN THE RANGE OF A SUM INPUT-OUTPUT RELATION AND IS NOT INCLUDED IN A NESTING INPUT-OUTPUT RELATION IS TREATED AS A RELATED LABEL
IF THERE ARE A PLURALITY OF STAGES, PROCESSING IS PERFORMED RECURSIVELY FROM A LOWER STAGE FOR EACH ROW OF AN UPPER STAGE

19

LABEL DATA

| 1 | 2 | 3 | 4 | 5 | 6 |
|---|---|---|---|---|---|
| TRAFFIC ACCIDENTS TOTAL NUMBER | TRAFFIC ACCIDENTS DEATHS | TRAFFIC ACCIDENTS INJURIES | WATER ACCIDENTS TOTAL NUMBER | WATER ACCIDENTS DEATHS | WATER ACCIDENTS INJURIES |

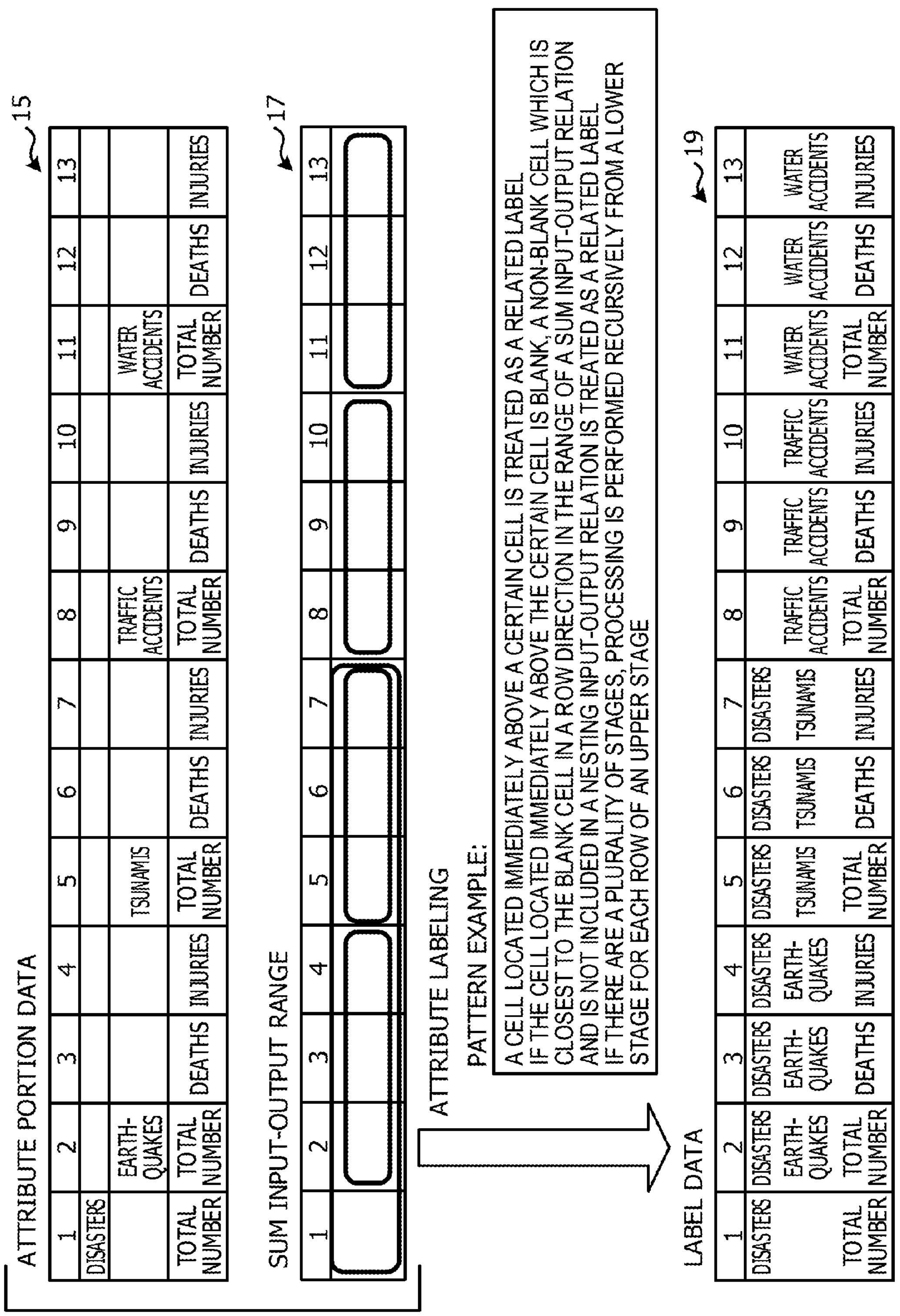

FIG. 22

ATTRIBUTE PORTION DATA ~15

| 1 | 2 | 3 | 4 | 5 | 6 | 7 | 8 | 9 | 10 | 11 | 12 | 13 |
|---|---|---|---|---|---|---|---|---|----|----|----|----|
| DISASTERS | | | | | | | | | | | | |
| | EARTH-QUAKES | | | TSUNAMIS | | | TRAFFIC ACCIDENTS | | | WATER ACCIDENTS | | |
| TOTAL NUMBER | TOTAL NUMBER | DEATHS | INJURIES | TOTAL NUMBER | DEATHS | INJURIES | TOTAL NUMBER | DEATHS | INJURIES | TOTAL NUMBER | DEATHS | INJURIES |

SUM INPUT-OUTPUT RANGE ~17

ATTRIBUTE LABELING
PATTERN EXAMPLE:
A CELL LOCATED IMMEDIATELY ABOVE A CERTAIN CELL IS TREATED AS A RELATED LABEL. IF THE CELL LOCATED IMMEDIATELY ABOVE THE CERTAIN CELL IS BLANK, A NON-BLANK CELL WHICH IS CLOSEST TO THE BLANK CELL IN A ROW DIRECTION IN THE RANGE OF A SUM INPUT-OUTPUT RELATION AND IS NOT INCLUDED IN A NESTING INPUT-OUTPUT RELATION IS TREATED AS A RELATED LABEL. IF THERE ARE A PLURALITY OF STAGES, PROCESSING IS PERFORMED RECURSIVELY FROM A LOWER STAGE FOR EACH ROW OF AN UPPER STAGE

LABEL DATA ~19

| 1 | 2 | 3 | 4 | 5 | 6 | 7 | 8 | 9 | 10 | 11 | 12 | 13 |
|---|---|---|---|---|---|---|---|---|----|----|----|----|
| DISASTERS | DISASTERS | DISASTERS | DISASTERS | DISASTERS | DISASTERS | DISASTERS | DISASTERS | DISASTERS | DISASTERS | DISASTERS | DISASTERS | DISASTERS |
| | EARTH-QUAKES | EARTH-QUAKES | EARTH-QUAKES | TSUNAMIS | TSUNAMIS | TSUNAMIS | TRAFFIC ACCIDENTS | TRAFFIC ACCIDENTS | TRAFFIC ACCIDENTS | WATER ACCIDENTS | WATER ACCIDENTS | WATER ACCIDENTS |
| TOTAL NUMBER | TOTAL NUMBER | DEATHS | INJURIES | TOTAL NUMBER | DEATHS | INJURIES | TOTAL NUMBER | DEATHS | INJURIES | TOTAL NUMBER | DEATHS | INJURIES |

DATA PROCESSING METHOD, NON-TRANSITORY COMPUTER-READABLE STORAGE MEDIUM, AND DATA PROCESSING DEVICE

CROSS-REFERENCE TO RELATED APPLICATION

This application is based upon and claims the benefit of priority of the prior Japanese Patent Application No. 2015-158512, filed on Aug. 10, 2015, the entire contents of which are incorporated herein by reference.

FIELD

The embodiment discussed herein is related to a data processing method, a non-transitory computer-readable storage medium, and an information processing device.

BACKGROUND

An attempt to spread the use of open data which makes it possible for a third party to reuse the information held by the country or companies has become a trend. It is expected that, by combining a variety of information such as linked data, it becomes possible to perform sophisticated search and analysis which have been impossible to be performed by the existing technique. The disclosed data sometimes has a format which is easily subjected to machine processing, such as resource description framework (RDF), and sometimes has a format which is not easily subjected to machine processing (the format whose design of a correspondence between a numerical value and an attribute is not strict enough), such as Excel data or comma-separated values (CSV). What will become important in the future is how to convert efficiently such numerical tabular data into a format which is easily processed.

FIG. 1 is a diagram depicting an example of the numerical tabular data and includes numerical portion data in which numerical values are set and attribute portion data in which character strings (text) are set. In this example, in a left part (a left-hand direction) and an upper part (an upper direction) of the numerical portion data, the attribute portion data is provided. Depending on the numerical tabular data, the attribute portion data is sometimes present in only one of the left part and the upper part of the numerical portion data.

FIG. 2 indicates that, in the numerical tabular data depicted in FIG. 1, a numerical value "37,825,636" surrounded with a thick frame is related to an attribute "cash benefits" in the left part and an attribute "FY 2005 (Heisei 17)" in the upper part.

FIG. 3 indicates that, in the numerical tabular data depicted in FIG. 1, attributes surrounded with a thick frame include an unexplicit hierarchical structure. That is, although it is implicitly indicated that attributes such as "retirement pensions" hold subordinate positions to "cash benefits" in the thick frame because the heads of the characters of these attributes are shifted, it is not impossible to determine a hierarchical structure clearly. If a person who understands the meaning of the attributes such as "cash benefits" and "retirement pensions" views this numerical tabular data, the person is able to understand a hierarchical structure; however, it is difficult to perform accurate processing if processing is performed mechanically.

FIG. 4 indicates that there is a sum input-output relation among numerical values corresponding to the attributes in the thick frame described in FIG. 3. That is, a numerical value "37,188,028" corresponding to "cash benefits" is the sum of numerical values "36,724,189" to "61,174" corresponding to "retirement pensions" to "other cash benefits". Incidentally, depending on the numerical tabular data, there is sometimes a product input-output relation instead of a sum input-output relation.

FIG. 5 is an example of attribute labeling performed by appropriately recognizing a hierarchical structure of the attributes "I Elderly people" to "other cash benefits" surrounded with a thick frame in the numerical tabular data depicted in FIG. 1, and it is desired that such attribute labeling is performed automatically.

Hereinafter, a method of existing automatic attribute labeling will be described. Incidentally, the following description deals with a case in which input regions (cells) of numerical values spread in a horizontal direction and attributes are disposed in an upper part, but the same applies to a case in which the input regions of numerical values spread in a vertical direction and the attributes are disposed in a left part. Moreover, the following description deals with a case in which there is a sum input-output relation among numerical values in the input regions, but the same applies to a case in which there is a product input-output relation among numerical values in the input regions.

FIG. 6 is a diagram depicting an example of the existing attribute labeling and depicts an example in which, as numerical tabular data which is input, the "total number" and the numbers of "deaths" and "injuries" of each of "traffic accidents" and "water accidents" are indicated.

In the past, a person who performs processing has set an attribute labeling pattern such as "A cell located immediately above a certain cell is treated as a master label. If the cell located immediately above the certain cell is blank, a non-blank cell which is located on the left-hand side of the cell located immediately above the certain cell and is closest thereto is treated as a master label. If there are a plurality of stages, processing is performed recursively from a lower stage for each row of an upper stage." for such numerical tabular data in an information processing device and made the information processing device perform labeling automatically. For example, as for a label "total number" on the left end of the numerical tabular data, a label "traffic accidents" located immediately above the label "total number" is treated as a master label, and the label "total number" is regarded as a label having a hierarchical structure "traffic accidents-total number". As for a label "deaths" next to the label "total number", since a cell located immediately above the label "deaths" is blank, the label "traffic accidents" which is located on the left-hand side of the cell located immediately above the label "deaths" and is closest thereto is treated as a master label, and the label "deaths" is regarded as a label having a hierarchical structure "traffic accidents-deaths". The same goes for the other labels. In this example, labeling accurately reflecting a hierarchical structure is performed.

FIG. 7 is a diagram depicting another example of the existing attribute labeling, the example in which the positions of "traffic accidents" and "water accidents" of the numerical tabular data which is input are shifted to the right by one cell as compared to the positions in FIG. 6. As a material which humans view, this style is not an unnatural one; in this style, "traffic accidents" and "water accidents" are displayed in the middle of a group of "total number", "deaths", and "injuries".

In this case, if the same attribute labeling pattern as the attribute labeling pattern described above is applied, since another label is not present in a cell located immediately above a label "total number" located on the left end of the numerical tabular data, a cell located on a left-hand side of the cell located immediately above the label "total number", and a cell located above the cell located immediately above the label "total number", the label "total number", which is supposed to be labeled as "traffic accidents-total number", is incorrectly labeled simply as "total number". Moreover, as for "total number" belonging to "water accidents", "traffic accidents" which is located on the left-hand side of the blank cell located immediately above this "total number" and is closest thereto is treated as a master label, and this "total number", which is supposed to be labeled as "water accidents-total number", is incorrectly labeled as "traffic accidents-total number".

FIG. 8 is a diagram depicting another example of the existing attribute labeling, the example in which, as numerical tabular data which is input, on the left-hand side of the data depicted in FIG. 6, "total number", "deaths", and "injuries" related to "earthquakes" and "tsunamis" belonging to "disasters" and "total number" related to "disasters" are added. This example is a case in which there are a plurality of structural relations having different depths.

In this case, if the same attribute labeling pattern as the attribute labeling pattern described above is applied, for "traffic accidents" and "water accidents", "disasters" in the row located above "traffic accidents" and "water accidents" is treated as a master label, and a large number of incorrect labels with "disasters" attached thereto as a master label are undesirably generated.

On the other hand, a method of determining a hierarchical structure based on information defining the hierarchical structure of attribute values of tabular data and a method of determining a hierarchical structure based on the format or meaning of character strings in cells are disclosed (for example, see Japanese Laid-open Patent Publication No. 2013-257852, Japanese Examined Patent Application Publication No. 7-43707, and so forth).

Moreover, a method of judging whether or not cells have a master-slave relation by using indents or fonts as the amount of characteristics and extracting a combination having a tree structure is disclosed (for example, see Zen Chen and Michael Cafarella, "Automatic Web Spreadsheet Data Extraction", VLDB 2013 and so forth).

SUMMARY

According to an aspect of the invention, a data processing method executed by a computer, the data processing method including specifying a first region range among from a data table including a plurality of input regions arranged in a first direction and a second direction, a first region range including a plurality of numerical value regions which are continuously disposed in the first direction, each of the plurality of numerical value regions being an input region in which a numerical value is input, a plurality of numerical values in the plurality of numerical value regions having a relationship with a specified numerical value in an adjacent region adjacent to the first region range in the first direction, the relationship including a difference between a value that indicates a result of a calculation using the plurality of numerical values and the specified numerical value is equal to or less than a predetermined value, specifying a second region range among from the data table, the second region range being specified by shifting the first region range in the second direction, the second region range including at least one character string region and at least one blank region, the string region being an input region in which a character string is input, the blank region being an input region where any value is not input, associating a character string in the at least one character string region included in the second region range and the plurality of numerical values, and outputting data that indicates an association between the character string in the at least one character string region and the plurality of numerical values created by the associating. includes The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram (I) depicting an example of numerical tabular data,

FIG. 2 is a diagram (II) depicting an example of the numerical tabular data;

FIG. 3 is a diagram (III) depicting an example of the numerical tabular data;

FIG. 4 is a diagram (IV) depicting an example of the numerical tabular data;

FIG. 6 is a diagram (I) depicting an example of existing attribute labeling;

FIG. 7 is a diagram (II) depicting an example of the existing attribute labeling;

FIG. 8 is a diagram (III) depicting an example of the existing attribute labeling;

FIG. 12 is a diagram depicting an example of an attribute labeling pattern;

FIGS. 13A to 13C are diagrams (I) depicting examples of numerical tabular data, numerical portion data, and attribute portion data;

FIGS. 14A to 14C are diagrams (II) depicting examples of numerical tabular data, numerical portion data, and attribute portion data;

FIGS. 16A to 16C are diagrams explaining a continuous subset sum problem;

FIGS. 18A and 18B are diagrams (I) depicting an example of the extraction of a sum input-output range;

FIG. 21 is a diagram (I) depicting an example of attribute labeling; and

FIG. 22 is a diagram (II) depicting an example of the attribute labeling.

DESCRIPTION OF EMBODIMENT

In order to deal with the above-described incorrect attribute labeling depicted in FIG. 7 or 8, consideration has to be given to various patterns of numerical tabular data. However, it is not easy to create an exhaustive attribute labeling pattern and creating such a pattern is undesirably costly. In particular, an attribute labeling pattern which correctly recognizes a plurality of hierarchical structures having different depths, the hierarchical structures depicted in FIG. 8, becomes complicated and cost for creating such a pattern becomes large.

On the other hand, in the method of determining a hierarchical structure based on information defining the hierarchical structure of attribute values of tabular data, the hierarchical structure of the attribute values has to be defined in advance, which makes it difficult to process a wide range of numerical tabular data of whatever field.

Moreover, the field of numerical tabular data which is processible by the method of determining a hierarchical structure based on the format or meaning of character strings in cells is limited, which makes it difficult to process a wide range of numerical tabular data of whatever field. As for the method of using indents or fonts as the amount of characteristics, it is difficult to apply this method to simple tabular data, such as CSV, with characters which are not qualified.

Thus, the embodiment makes it easy to specify attribute information which is related to each piece of numerical data in numerical tabular data.

Hereinafter, a preferred embodiment will be described.

<Configuration>

Figure 9:
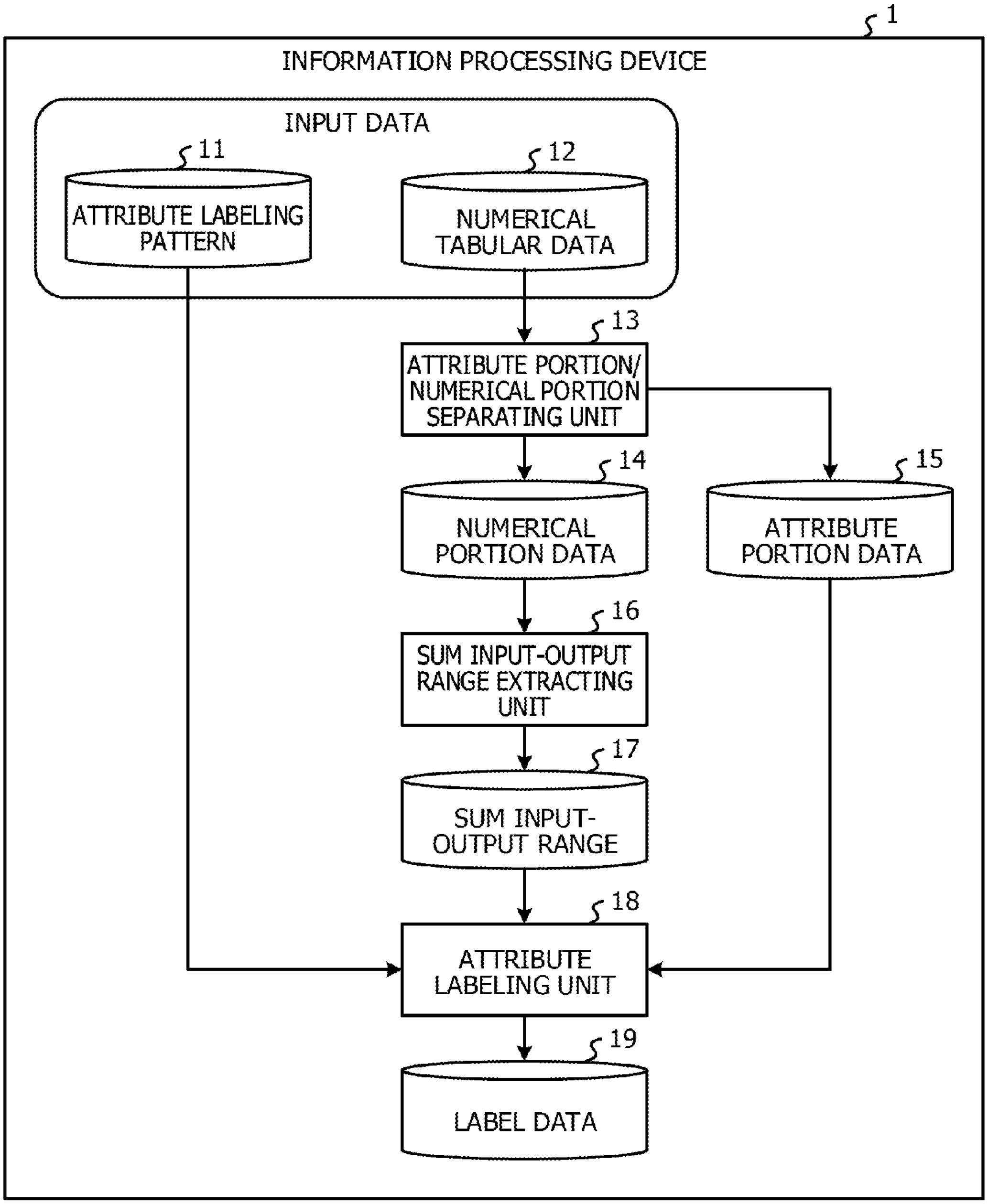
FIG. 9 is a diagram depicting a software configuration example of an information processing device according to an embodiment.

FIG. 9 is a diagram depicting a software configuration example of an information processing device 1 according to the embodiment. Incidentally, an example corresponding to a case in which there is a sum input-output relation among numerical values in input regions will be described, but the example is also applicable similarly to a case in which there is a product input-output relation among the numerical values in the input regions.

In FIG. 9, the information processing device 1 includes an attribute labeling pattern 11 and numerical tabular data 12 which are input data from a user (a person who performs an operation), an attribute portion/numerical portion separating unit 13, and numerical portion data 14 and attribute portion data 15 which are output data of the attribute portion/numerical portion separating unit 13. Moreover, the information processing device 1 includes a sum input-output range extracting unit 16, a sum input-output range 17 which is output data of the sum input-output range extracting unit 16, an attribute labeling unit 18, and label data 19 which is output data of the attribute labeling unit 18.

The attribute labeling pattern 11 is information used for attribute labeling which is performed by the attribute labeling unit 18. A specific example of the attribute labeling pattern 11 will be described later. The numerical tabular data 12 is data to be processed and is numerical tabular data having a format which is not easily subjected to machine processing, the format whose design is not strict enough, such as Excel data or CSV. Moreover, it is assumed that, in the numerical tabular data 12, there is a sum or product input-output relation among the numerical data and there is sometimes a hierarchical structure among the attributes. A specific example of the numerical tabular data 12 will be described later.

The attribute portion/numerical portion separating unit 13 has the function of separating and extracting the numerical portion data 14 and the attribute portion data 15 from the numerical tabular data 12. The numerical portion data 14 is data of the numerical value portion included in the numerical tabular data 12. A specific example of the numerical portion data 14 will be described later. The attribute portion data 15 is data of the attribute portion included in the numerical tabular data 12. A specific example of the attribute portion data 15 will be described later.

The sum input-output range extracting unit 16 has the function of extracting, from the numerical portion data 14, a range (a region range) in which a sum input-output relation is present. The details of the processing will be described later. The sum input-output range 17 is information on the range in which the sum input-output relation extracted by the sum input-output range extracting unit 16 is present. A specific example of the sum input-output range 17 will be described later. When a product input-output relation in place of the sum input-output relation is dealt with, a "product input-output range extracting unit" is used in place of the sum input-output range extracting unit 16 so as to extract a range in which a product input-output relation is present. Moreover, when there are both a sum input-output relation and a product input-output relation, both the sum input-output range extracting unit 16 and the "product input-output range extracting unit" are used.

The attribute labeling unit 18 has the function of performing attribute labeling on the attribute portion data 15 by referring to the sum input-output range 17 and the attribute labeling pattern 11. The details of the processing will be described later. The label data 19 is data obtained as a result of the attribute labeling performed by the attribute labeling unit 18. A specific example of the label data 19 will be described later.

Figure 10:
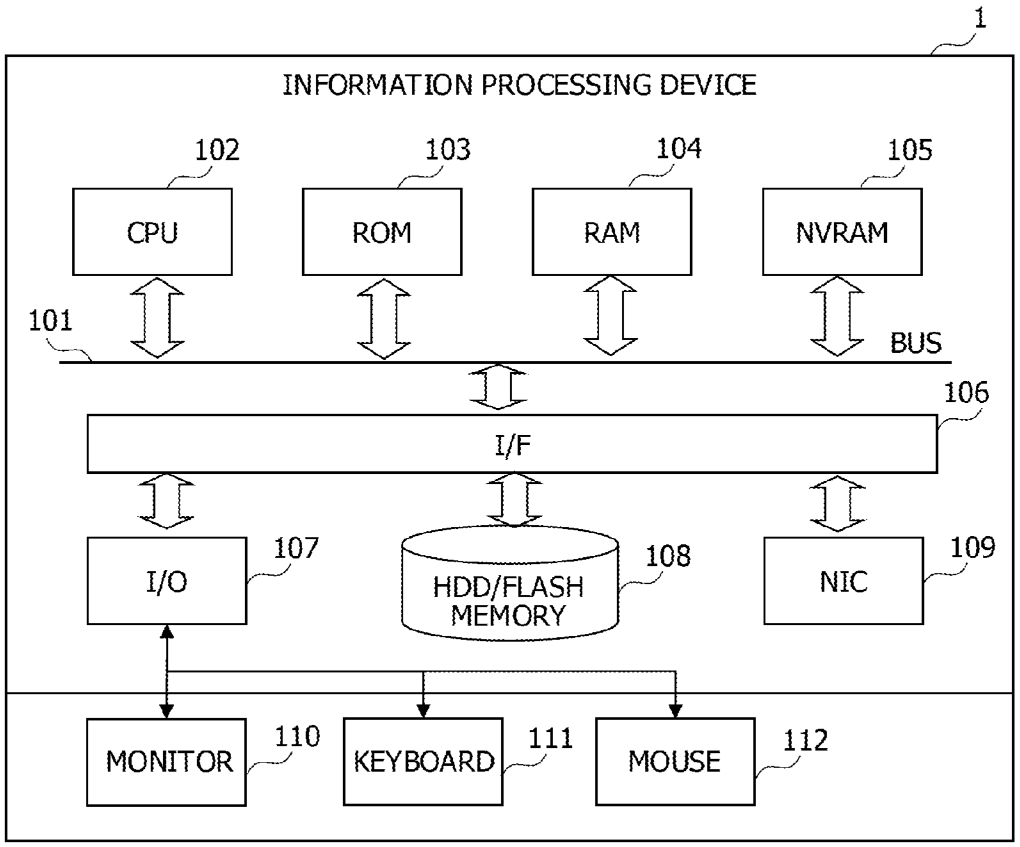
FIG. 10 is a diagram depicting a hardware configuration example of the information processing device.

FIG. 10 is a diagram depicting a hardware configuration example of the information processing device 1. In FIG. 10, the information processing device 1 includes a central processing unit (CPU) 102, read-only memory (ROM) 103, random-access memory (RAM) 104, and non-volatile random-access memory (NVRAM) 105 which are connected to a system bus 101. Moreover, the information processing device 1 includes an interface (I/F) 106, an input/output device (I/O) 107, hard disk drive (HDD)/flash memory 108, a network interface card (NIC) 109 which are connected to the I/F 106, a monitor 110, a keyboard 111, and a mouse 112 which are connected to the I/O 107, and so forth. To the I/O 107, a compact disk/digital versatile disk (CD/DVD) drive or the like may be connected.

The functions of the information processing device 1 described in FIG. 9 are implemented as a result of a predetermined program being executed in the CPU 102. The program may be a program which is obtained via a recording medium or a program which is obtained via a network.

<Operation>

Figure 11:
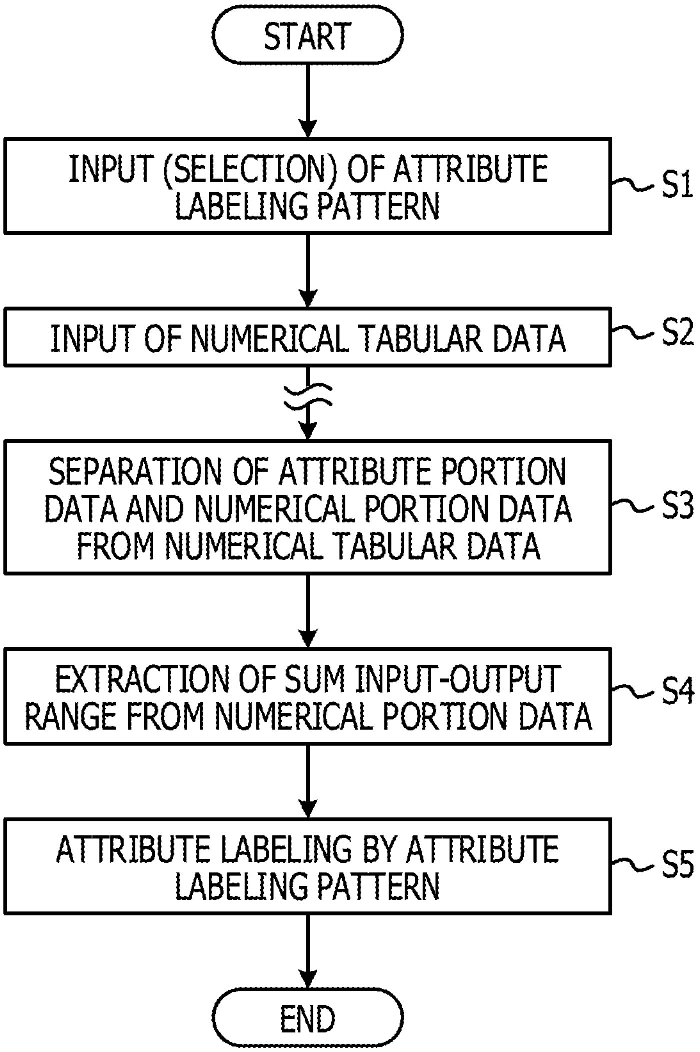
FIG. 11 is a flowchart of a processing example of the embodiment.

FIG. 11 is a flowchart of a processing example of the above-described embodiment. In FIG. 11, the information processing device 1 performs input of the attribute labeling pattern 11 (including a case in which input is selected from the inputs prepared in advance) (step S1). FIG. 12 is a diagram depicting an example of the attribute labeling pattern 11 and the description thereof is as follows: "A cell located immediately above a certain cell is treated as a related label. If the cell located immediately above the certain cell is blank, a non-blank cell which is closest to the blank cell in a row direction in the range of a sum input-output relation and is not included in a nesting input-output relation is treated as a related label. If there are a plurality of stages, processing is performed recursively from a lower stage for each row of an upper stage." Incidentally, this example corresponds to a case in which input regions (cells) of numerical values spread in a horizontal direction and attributes are disposed in an upper part. If the input regions of the numerical values spread in a vertical direction and attributes are disposed in a left part, by replacing, for example, "immediately above", "row", "lower stage", and "upper stage" with "immediately to the left of", "column", "right stage", and "left stage", respectively, it is possible to apply this example in a similar manner. Moreover, as the format of internal data of the attribute labeling pattern 11, a format using symbols or the like may be used.

Back in FIG. 11, the information processing device 1 performs input of the numerical tabular data 12 to be processed (step S2). FIG. 13A depicts an example of the numerical tabular data 12, which is the same as the numerical tabular data on which extraction is not performed normally by the existing method (FIG. 7). Moreover, FIG. 14A depicts another example of the numerical tabular data 12, which is the same as the numerical tabular data on which extraction is not performed normally by the existing method (FIG. 8).

Back in FIG. 11, when substantial processing is started after the input data becomes complete, the attribute portion/numerical portion separating unit 13 separates and extracts the numerical portion data 14 and the attribute portion data 15 from the numerical tabular data 12 (step S3). That is, the attribute portion/numerical portion separating unit 13 recognizes whether a numerical value is set or a character string is set by scanning each cell of the numerical tabular data 12 and extracts a region in which the numerical value is set as the numerical portion data 14 and a region in which the character string is set as the attribute portion data 15. The numerical portion data 14 and the attribute portion data 15 also include information indicating the position of a column or row specifying the position of the cell in the numerical tabular data 12.

FIG. 13B depicts the numerical portion data 14 extracted from the numerical tabular data 12 of FIG. 13A, and FIG. 13C depicts the attribute portion data 15 extracted from the numerical tabular data 12 of FIG. 13A. Moreover, FIG. 14B depicts the numerical portion data 14 extracted from the numerical tabular data 12 of FIG. 14A, and FIG. 14C depicts the attribute portion data 15 extracted from the numerical tabular data 12 of FIG. 14A.

Back in FIG. 11, the sum input-output range extracting unit 16 extracts a sum input-output range from the numerical portion data 14 (step S4). Hereinafter, the details of the extraction of the sum input-output range will be described.

Figure 15:
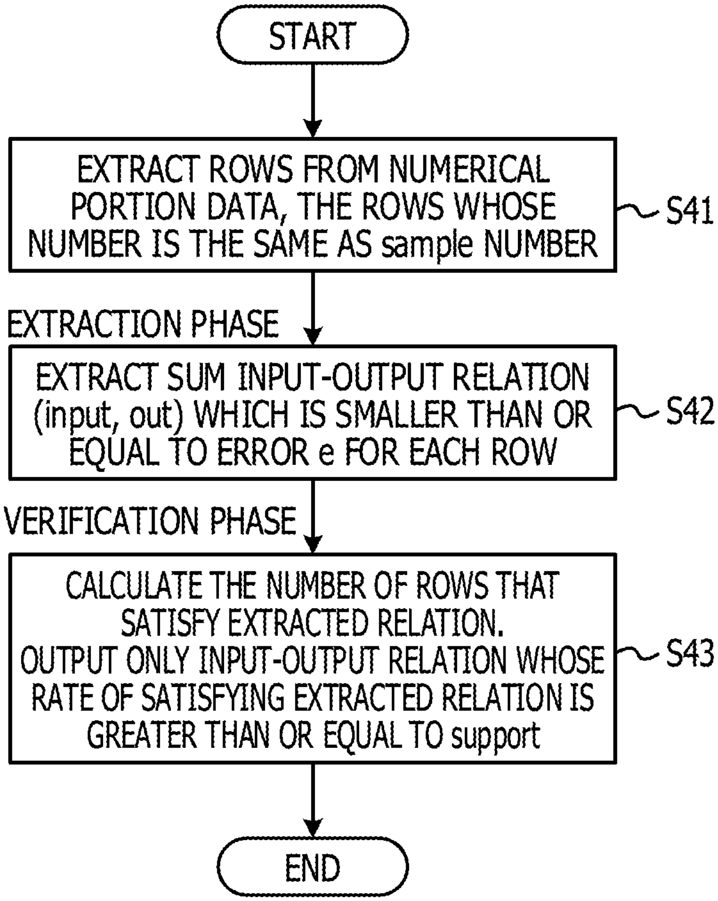
FIG. 15 is a flowchart of a processing example of the extraction of a sum input-output range when no consideration is given to nesting.

FIG. 15 is a flowchart of a processing example of the extraction of the sum input-output range (step S4 of FIG. 11) when no consideration is given to nesting. Nesting is a case in which one sum input-output range includes another sum input-output range. In the processing depicted in FIG. 15, although extracting a sum input-output relation is performed at a high cost, verifying whether or not a certain sum input-output relation satisfies the relation is performed at a low cost; therefore, a sum input-output relation is extracted from a sampled row and verification as to whether or not the extracted relation is satisfied in all the rows is performed. This makes it possible to reduce the total cost.

In FIG. 15, the sum input-output range extracting unit 16 extracts rows from the numerical portion data 14, the rows whose number is the same as a sample number (step S41). The sample number is the number of rows from which a possible input-output relation is calculated and is set in advance.

Then, as an extraction phase, the sum input-output range extracting unit 16 extracts a sum input-output relation (input, out) which is smaller than or equal to an error e for each sampled row (step S42). The error e is a value indicating a permissible upper limit of a subtle numerical difference which is caused by, for example, rounding of numerical values and is a small value. The error e may be defined by a value of a difference in numerical data or may be defined by a ratio (the ratio of a difference between the input sum and an output to one of the values of the input sum and the output, the one which is greater than the other).

Extracting a sum input-output relation (input, out) boils down to, if an input range and an output position are continuous, solving the "continuous subset sum problem" (the "continuous subset product problem" for a product input-output relation). FIG. 16A depicts a conditional expression in a case in which a sum input-output relation falls within the range of the error e when an output position is assumed to be i, an input range start position is assumed to be j, and an input range end position is assumed to be k for an integer array S (if the length of the array is assumed to be n, elements are S[1] to S[n]). The input range defined by the input range start position j and the input range end position k becomes input of the sum input-output relation, and the output position i corresponds to output of the sum input-output relation. FIG. 16B depicts a case in which the input range is present on the right-hand side of the output position i and FIG. 16C depicts a case in which the input range is present on the left-hand side of the output position i, and the conditional expression of FIG. 16A covers both cases.

Figure 17:
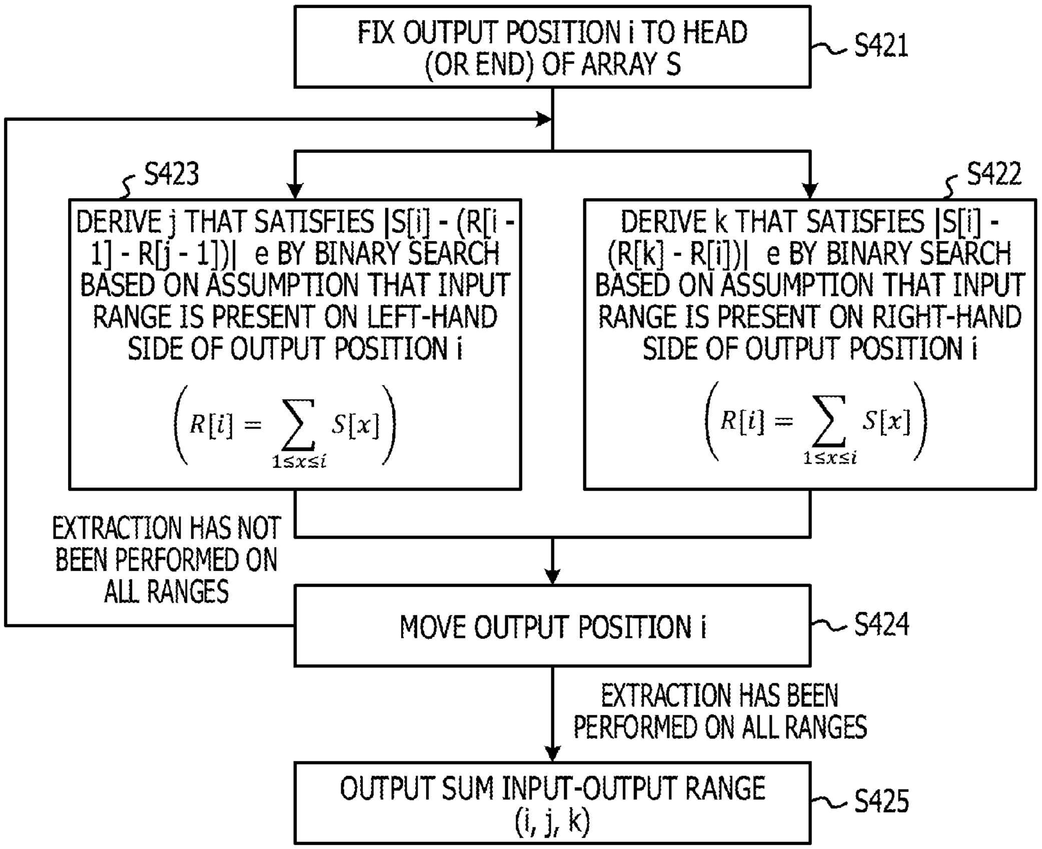
FIG. 17 is a flowchart of a processing example of the extraction of a sum input-output relation, the extraction using a cumulative sum array and a binary search.

FIG. 17 is a flowchart of a processing example of the extraction of the sum input-output relation (step S42 of FIG. 15), the extraction using a cumulative sum array and a binary search. In this processing example, introducing a cumulative sum array R (a cumulative product array for a product input-output relation) for the integer array S and using a binary search makes calculation in time O(n log n) (O: order) possible.

In FIG. 17, the sum input-output range extracting unit 16 fixes the output position i to the head (or the end) of the array S (step S421).

Then, the sum input-output range extracting unit 16 concurrently or sequentially derives k or j by a binary search for a case in which the input range is assumed to be present on the right-hand side of the output position i and a case in which the input range is assumed to be present on the left-hand side of the output position i (step S422, S423).

The binary search which is performed in the case where the input range is assumed to be present on the right-hand side of the output position i is as follows. First, the binary search is performed by setting an upper bound up to the size of the array S and a lower bound low to i+1 (=j). If a median value c is assumed to be an intermediate position between the upper bound up and the lower bound low, c=(up+low)/2.

Here, what is desired to be obtained is k that satisfies $|S[i]-(R[k]-R[i])|\leq e$. Thus, if the condition is satisfied when k=c, the binary search is ended. If the condition is not satisfied, the search is continuously performed by setting a new upper bound up and a new lower bound low. Since k is smaller than c if $R[c]-R[i]>S[i]+e$, settings are made such that up=c−1 and processing is performed recursively. Moreover, since k is greater than c if $R[c]-R[i]<S[i]-e$, settings are made such that low=c+1 and processing is performed recursively. If up<low, there is no solution for the current i. The same way of processing is applied to the case in which the input range is assumed to be present on the left-hand side of the output position i.

Then, the sum input-output range extracting unit 16 moves the output position i (step S424). If the extraction has not been performed on all the ranges, the sum input-output range extracting unit 16 repeats the processing from the derivation of k or j (step S422, S423); if the extraction has been performed on all the ranges, the sum input-output range extracting unit 16 outputs a sum input-output range (i, j, k) (step S425).

FIGS. 18A and 18B are diagrams depicting an example of the extraction of a sum input-output range and depict a case in which processing is performed on the numerical portion data 14 of FIG. 13B. In FIG. 18A, when the output position i=1, the condition is satisfied when j=2 and k=3; when the output position i=4, the condition is satisfied when j=5 and k=6, which is output as the sum input-output range 17 as depicted in FIG. 18B. The sum input-output range 17 is depicted in a visible manner in FIG. 18B; internally, it is possible to express the sum input-output range 17 by holding the values of i, j, and k.

Back in FIG. 15, as a verification phase, the sum input-output range extracting unit 16 calculates the number of rows that satisfy the extracted relation and outputs only an input-output relation whose rate of satisfying the extracted relation is greater than or equal to a support value support (step S43). Here, support is a threshold value used to determine whether or not to output a possible input-output relation and is set in advance.

Figure 19:
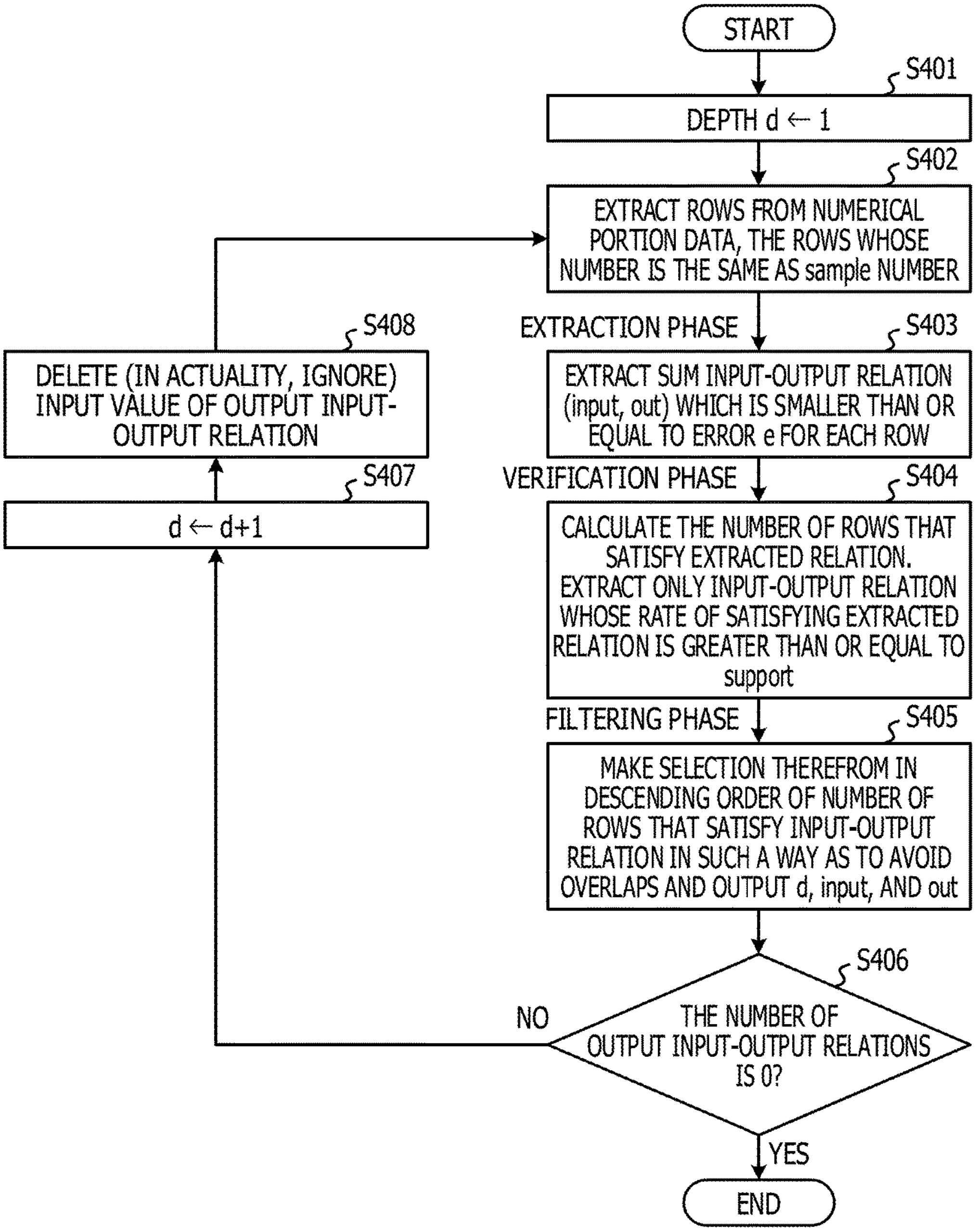
FIG. 19 is a flowchart of a processing example of the extraction of a sum input-output range when consideration is given to nesting.

FIG. 19 is a flowchart of a processing example of the extraction of a sum input-output range when consideration is given to nesting. This processing example makes it possible to deal with nesting by increasing the depth d of nesting sequentially from 1 and deleting the input value of the extracted sum input-output range. In this processing, together with the cumulative sum array R and the binary search of FIG. 17, if the maximum depth of nesting is set to m, it is possible to perform calculation in time O(mn log n).

In FIG. 19, the sum input-output range extracting unit 16 sets 1 as the depth d (step S401).

Then, the sum input-output range extracting unit 16 extracts rows from the numerical portion data 14, the rows whose number is the same as the sample number (step S402). This processing is the same as the above-described processing (step S41 of FIG. 15).

Next, as an extraction phase, the sum input-output range extracting unit 16 extracts a sum input-output relation (input, out) which is smaller than or equal to the error e for each sampled row (step S403). This processing is the same as the above-described processing (step S42 of FIG. 15).

Then, as a verification phase, the sum input-output range extracting unit 16 calculates the number of rows that satisfy the extracted relation and extracts only an input-output relation whose rate of satisfying the extracted relation is greater than or equal to the support value support (step S404). This processing is the same as the above-described processing (step S43 of FIG. 15).

Next, as a filtering phase, the sum input-output range extracting unit 16 makes a selection therefrom in descending order of number of rows that satisfy the input-output relation in such a way as to avoid overlaps and outputs d, input, and out (step S405).

If the number of output input-output relations is not 0 (No in step S406), the sum input-output range extracting unit 16 increments the depth d (step S407), deletes (in actuality, ignores) the input value of the output input-output relation (step S408), and repeats the processing from the extraction of rows (step S402). If the number of output input-output relations is 0 (Yes in step S406), the sum input-output range extracting unit 16 ends the processing.

Figure 20A:
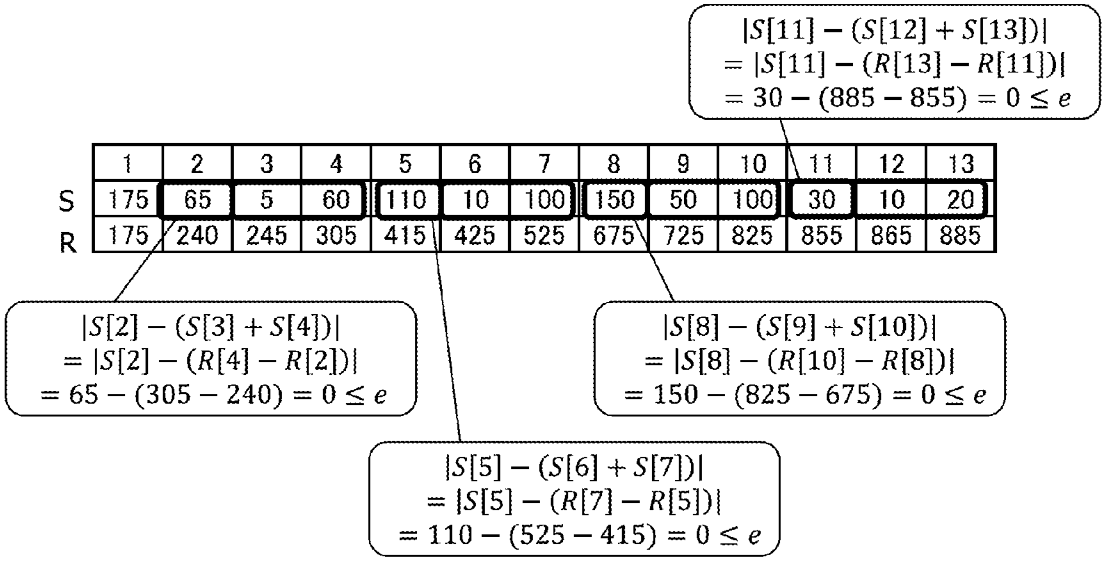
FIGS. 20A to 20C are diagrams (II) depicting an example of the extraction of a sum input-output range.
Figure 20B:
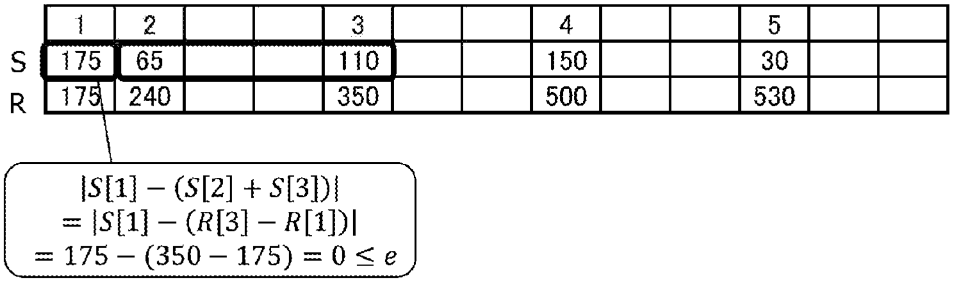
Figure 20C:
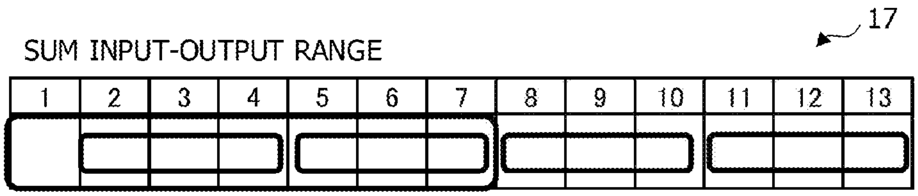

FIGS. 20A to 20C are diagrams depicting another example of the extraction of a sum input-output range and depict a case in which processing is performed on the numerical portion data 14 of FIG. 14B. In FIG. 20A, in the first extraction phase (step S403), the condition is satisfied when j=3 and k=4 for the output position i=2, when j=6 and k=7 for the output position i=5, when j=9 and k=10 for the output position i=8, and when j=12 and k=13 for the output position i=11.

A state in which, in the first verification phase (step S404), the above-described sum input-output range is extracted and is output in the filtering phase (step S405) and the input value is deleted (step S408) is depicted in FIG. 20B. The deleted array position is renumbered. In this state, in the second extraction phase (step S403), the condition is satisfied when j=2 and k=3 for the output position i=1. FIG. 20C depicts the sum input-output range 17 to be output. Incidentally, the array position renumbered due to the deletion of the input value is converted to the original position (including a case in which, if another deleted input value comes after the array position, the position is extended to the rear end thereof).

Back in FIG. 11, the attribute labeling unit 18 performs attribute labeling on the attribute portion data 15 by referring to the sum input-output range 17 and the attribute labeling pattern 11 and outputs the result of the attribute labeling as the label data 19 (step S5).

FIG. 21 is a diagram depicting an example of attribute labeling and corresponds to the example of FIGS. 13A to 13C. In FIG. 21, as for a label "total number" on the left end of the attribute portion data 15, since a cell immediately above the label "total number" is blank, incorrect labeling is performed by the existing method (FIG. 7). However, in this embodiment, since "traffic accidents" which is closest to the blank cell in a row direction in the sum input-output range to which the label "total number" belongs is treated as a related label (a master label), the label "total number" is correctly labeled as "traffic accidents-total number". Moreover, as for "total number" belonging to "water accidents", incorrect labeling is performed thereon by the existing method (FIG. 7); however, in this embodiment, "total number" belonging to "water accidents" is correctly labeled as "water accidents-total number".

FIG. 22 is a diagram depicting another example of the attribute labeling and corresponds to the example of FIGS. 14A to 14C. In FIG. 22, as for "traffic accidents" and "water accidents" of the attribute portion data 15, "traffic accidents" and "water accidents" are incorrectly labeled by the existing method (FIG. 8) by being attached with "disasters" in the row located above "traffic accidents" and "water accidents". However, in this embodiment, since a determination is made based on the sum input-output range to which each of "traffic accidents" and "water accidents" belongs, there is no possibility that "disasters" is incorrectly treated as a master label thereof.

Figure 5:
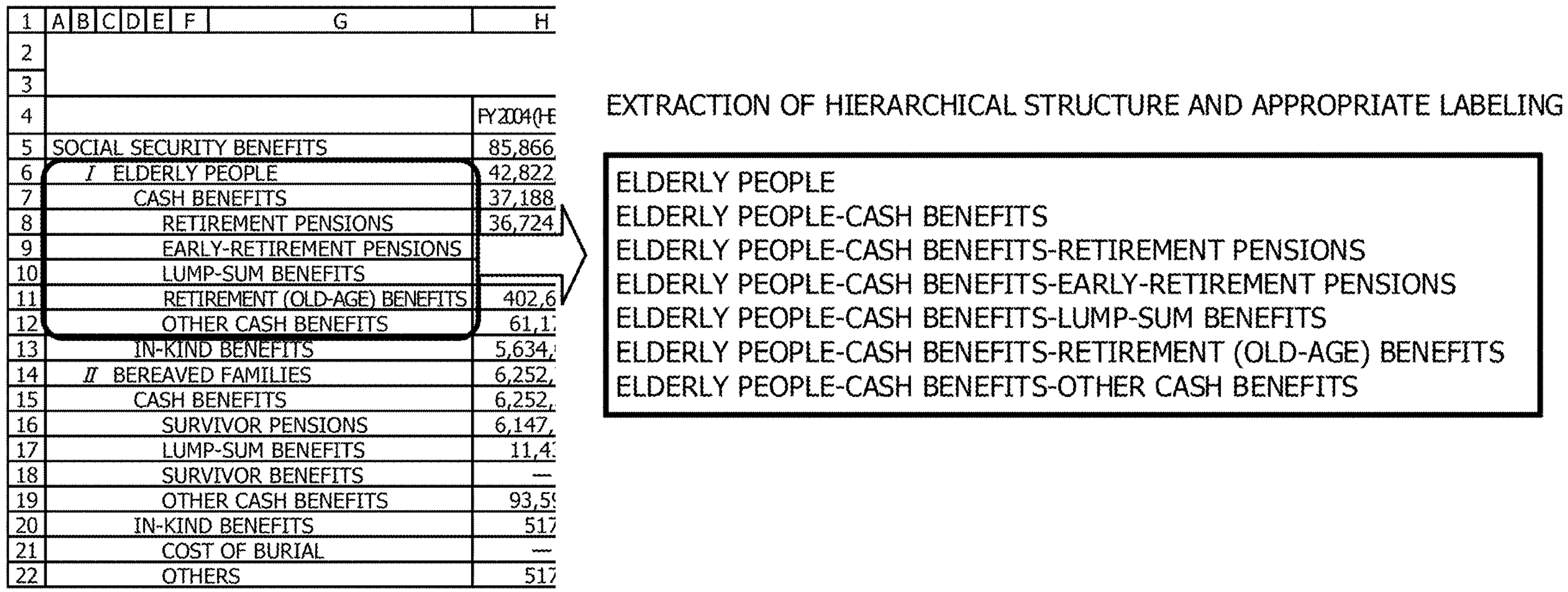
FIG. 5 is a diagram (V) depicting an example of the numerical tabular data.

Incidentally, also in a case depicted in FIG. 5 in which the attributes and the numerical values are arranged in the vertical direction, it is possible to perform accurate labeling by the extraction of a sum input-output relation corresponding to the vertical direction.

<General Description>

As described above, according to this embodiment, it is possible to specify easily attribute information which is related to each piece of numerical data in numerical tabular data. Moreover, it becomes possible to process various patterns by a simpler pattern and therefore reduce pattern creation cost as compared to the existing method. Furthermore, by limiting the extraction range by a sum/product input-output relation, it is expected that a reduction in the occurrence of incorrect labeling and quality improvement are achieved.

The above is the description of the preferred embodiment. The description has been given here by using specific examples, but it goes without saying that it is possible to modify and change these specific examples in various ways without departing from the wide subject matter and scope defined in the claims.

The numerical portion data 14 is an example of "a plurality of input regions in which numerical values are input". The sum input-output relation or the product input-output relation is an example of an "arithmetic relation". The attribute portion data 15 is an example of "input regions disposed in a left-hand direction or an upper direction".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A data processing method executed by a computer, the data processing method comprising:

specifying a first region range from a data table including a plurality of input regions arranged in a first direction and a second direction, a first region range being a plurality of numerical value regions which are continuously disposed in the first direction, each of the plurality of numerical value regions being an input region in which a numerical value is input, a plurality of numerical values input in the plurality of numerical value regions satisfy a predetermined condition that a difference between a calculation result of a calculation using the plurality of numerical values and a specified numerical value input in an adjacent region adjacent to the first direction is less than a predetermined threshold;

specifying a second region range from the data table, the second region range being located at a position where the first region range is translated in the second direction, the second region range including at least one character string region in which a character string is input and at least one blank region in which any value is not input;

associating the character string and each of the plurality of numerical values; and outputting data that indicates a correspondence between the character string and each of the plurality of numerical values based on the associating.

2. The data processing method according to claim 1, wherein the calculation result is a sum of the plurality of numerical values or a product of the plurality of numerical values; and wherein the first region range is specified by solving a subset sum problem or a subset product problem for the plurality of input regions in the data table.

3. The data processing method according to claim 2, wherein the first region range is specified by fixing the adjacent region sequentially and by using a binary search.

4. The data processing method according to claim 2, wherein the first region range is specified by deleting the specified first input range in the data table and repeating a processing of the specifying until the first input regions is no longer specified.

5. The data processing method according to claim 1, wherein the first direction and the second direction are at right angles to each other.

6. A non-transitory computer-readable storage medium storing a data processing program that causes a computer to execute a process comprising:

specifying a first region range from a data table including a plurality of input regions arranged in a first direction and a second direction, a first region range being a plurality of numerical value regions which are continuously disposed in the first direction, each of the plurality of numerical value regions being an input region in which a numerical value is input, a plurality of numerical values input in the plurality of numerical value regions satisfy a predetermined condition that a difference between a calculation result of a calculation using the plurality of numerical values and a specified numerical value input in an adjacent region adjacent to the first direction is less than a predetermined threshold;

specifying a second region range from the data table, the second region range being located at a position where the first region range is translated in the second direction, the second region range including at least one character string region in which a character string is input and at least one blank region in which any value is not input;

associating the character string and each of the plurality of numerical values; and outputting data that indicates a correspondence between the character string and each of the plurality of numerical values based on the associating.

7. A data processing device comprising:

a memory; and a processor coupled to the memory and the processor configured to:

specify a first region range from a data table including a plurality of input regions arranged in a first direction and a second direction, a first region range being a plurality of numerical value regions which are continuously disposed in the first direction, each of the plurality of numerical value regions being an input region in which a numerical value is input, a plurality of numerical values input in the plurality of numerical value regions satisfy a predetermined condition that a difference between a calculation result of a calculation using the plurality of numerical values and a specified numerical value input in an adjacent region adjacent to the first direction is less than a predetermined threshold;

specify a second region range from the data table, the second region range being located at a position where the first region range is translated in the second direction, the second region range including at least one character string region in which a character string is input and at least one blank region in which any value is not input;

associate the character string and each of the plurality of numerical values; and output data that indicates a correspondence between the character string and each of the plurality of numerical values based on the associating.

* * * * *